United States Patent Office 2,828,340
Patented Mar. 25, 1958

2,828,340

HYDROXY - LOWER - ALKYL - BIS(CYCLOHEXYL-PROPYL)AMINES, SALTS THEREOF, AND PREPARATION THEREOF

William B. Dickinson, Loudonville, and Bernard L. Zenitz, Delmar, N. Y., assignors to Sterling Drug Inc., New York, N. Y., a corporation of Delaware No Drawing. Application June 14, 1954
Serial No. 436,710

14 Claims. (Cl. 260—563)

This invention relates to a new series of cycloalkyl-propyl amines bearing a hydroxylated alkyl group attached to the nitrogen atom, and to a process for the preparation thereof.

A particular aspect of the invention relates to hydroxy-lower-alkyl-bis(3-cyclohexylpropyl)amines and their acid-addition salts, said compounds thus having the formula

wherein R is hydrogen or a lower-alkyl group and R' is a lower-alkyl group bearing from one to three hydroxy groups, and acid-addition salts thereof.

In the above formula the group R represents a hydrogen atom or a lower-alkyl group. When R is a lower-alkyl group it can be in any one of the 2-, 3- and 4-positions with respect to the propyl side chain, and contains from one to about four carbon atoms, thus including methyl, ethyl, propyl, isopropyl, butyl, isobutyl and the like.

In the above formula the group R' represents a lower-alkyl group having from one to about eight carbon atoms and bearing from one to three hydroxy groups. The lower-alkyl group can be straight or branched, and the hydroxy group or groups can be located anywhere along the chain, except that two hydroxy groups cannot be attached to the same carbon atom. Exemplary of the group R' are hydroxymethyl, 2-hydroxyethyl, 3-hydroxy-propyl, 2-hydroxypropyl, 2-hydroxy-1-methylethyl, 2-hy-droxy-1,2-dimethylethyl, 2,3-dihydroxypropyl, 2,3,4-tri-hydroxybutyl, tris(hydroxymethyl)methyl, 3-hydroxypen-tyl, 3,5-dihydroxyhexyl, 8-hydroxyoctyl, tris(2-hydroxy-ethyl)methyl, and the like.

The compounds of the invention are prepared by the following reaction:

where X is halogen selected from chlorine, bromine and iodine, preferably bromine. The reaction is carried out by heating the reactants in an inert solvent in the presence of an acid acceptor such as sodium carbonate, designed to take up the hydrogen halide formed. The first substance produced in the reaction mixture is the secondary amine, $RC_6H_{10}CH_2CH_2CH_2NHR'$, which then reacts further with another mole of the cyclohexylpropyl halide to give the tertiary amine. Frequently the reaction mixture will be found to contain a mixture of the secondary and tertiary amines, the relative amounts of each depending upon the conditions of time and temperature used during the reaction. Higher temperatures and longer times favor the formation of the tertiary amine. The secondary and tertiary amines can be separated by fractional distillation, or by fractional crystallization or selective extraction of their acid-addition salts.

Alternatively a tertiary amine of formula I can be prepared by condensation of the secondary amine,

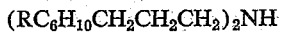

with an alkyl halide R'X. The secondary amine,

can be prepared by dialkylation of ammonia with

or by hydrogenolysis of the benzyl substituted tertiary amine, $(RC_6H_{10}CH_2CH_2CH_2)_2NCH_2C_6H_5$, in turn prepared by alkylation of benzylamine with

Compounds bearing a hydroxyl group in the group R' on the carbon atom immediately adjacent to the nitrogen atom are preferably prepared by an alternative procedure, i. e., by reaction of an aldehyde with the secondary amine, $(RC_6H_{10}CH_2CH_2CH_2)_2NH$, in which the latter adds across the double bond of the aldehyde as in the formation of aldehyde-ammonia. For example, formaldehyde reacts with the secondary amine to give a compound where R' is hydroxymethyl, viz.

In compounds where R is lower-alkyl a number of isomeric substances is possible. The lower-alkyl group may be in the 2-, 3- or 4-position and in the position cis or trans with respect to the propyl side chain. Mixtures of these isomers are often encountered during the course of synthesis. It is not necessary to separate these isomers in order to obtain useful and active products, but the separation may be carried out if desired and as illustrated in the examples below.

Our new compounds are useful either in the free base form or in the form of non-toxic acid-addition salts and these salts are within the purview of the invention. The acids which can be used to prepare acid-addition salts are preferably those which produce when combined with the free base, salts whose anions are relatively innocuous to the animal organism in therapeutic doses of the salts, so that the beneficial physiological properties inherent in the free base are not vitiated by side effects ascribable to the anions. Appropriate acid-addition salts are those derived from mineral acids such as hydrochloric acid, hydrobromic acid, hydriodic acid, nitric acid, phosphoric acid and sulfuric acid; and organic acids such as acetic acid, citric acid, tartaric acid, lactic acid, ethanesulfonic acid, quinic acid, sulfamic acid, and the like, giving the hydrochloride, hydrobromide, hydriodide, nitrate, phosphate or acid phosphate, sulfate or bisulfate, acetate, citrate or acid citrate, tartrate or bitartrate, lactate, ethanesulfonate, quinate, and sulfamate salts, respectively.

The compounds of our invention are useful as coronary dilators. When introduced into the mammalian organism by the intravenous route, the compounds dilate the coronary arteries and arterioles, increasing the heart blood flow. The compounds are therefore valuable in the treatment of myocardial ischemia due to organic or functional decrease in the caliber of the coronary vessels.

The new compounds are readily evaluated by measuring their effect upon the isolated perfused rabbit heart (Langendorff's method), in which the coronary vessels are constricted by the action of beta-hypophamine or naphazoline. A very dilute aqueous solution of known concentration is prepared from a sample of one of the compounds either in the free base form or as an acid-addition salt. The solution is then injected into the perfusion system and is thus perfused through the rabbit heart previously constricted by a given amount of beta-hypophamine added to the perfusion fluid, and the decrease in pressure necessary to maintain a constant rate of flow is measured. The dose of papaverine, a standard drug for the purpose, necessary to produce the same drop in pressure is also measured. The ratio of the concentration of papaverine to that of the new compound is a measure of the efficacy of the latter.

The following examples will further illustrate the invention.

EXAMPLE 1

(a) Methylcinnamic acid

A mixture of 228.8 g. of malonic acid 160 cc. of dry pyridine, 240 g. of m-tolualdehyde (containing some o- and p-tolualdehyde) and 2.0 cc. of dry piperidine was heated to 60° C. and then gradually heated further over a period of three hours at 105° C. After another hour at 105° C. the reaction mixture was cooled, about one liter of benzene was added followed by 250 cc. of concentrated hydrochloric acid in 250 cc. of water. The mixture was shaken and the layers were separated. The benzene layer was washed with water, with sodium carbonate solution and again with water. Concentrated hydrochloric acid was added to the sodium carbonate extracts to the point of incipient precipitation, but maintaining the solution still on the alkaline side. The solution was heated nearly to boiling, decolorized with activated charcoal and filtered. The filtrate was then acidified to Congo red with concentrated hydrochloric acid and the precipitated material was collected by filtration, giving 259.7 g. of 3-methylcinnamic acid (containing some 2- and 4-methylcinnamic acid). The methylcinnamic acid was further purified by recrystallization from dilute ethanol, obtaining a product with the M. P. 93–98° C.

(b) β-(methylcyclohexyl)propionic acid

A solution of 48.6 g. of 3-methylcinnamic acid, M. P. 93–98° C., containing some 2-methyl and 4-methylcinnamic acid, in 750 cc. of glacial acetic acid was hydrogenated in the presence of 1.2 g. of platinum oxide catalyst at an initial pressure of 515 lbs. per sq. inch. After five and one-half hours the theoretical quantity of hydrogen had been taken up, the catalyst was removed by filtration, the filtrate concentrated in vacuo and the residue distilled. The fraction boiling at 105–106° C. (0.08–9.11 mm.) was collected, giving 48.7 g. of β-(methylcyclohexyl)propionic acid (mixture of 2-, 3- and 4-methyl and cis and trans isomers).

(c) 3-(methylcyclohexyl)propanol

A solution of 60.0 g. of β-(methylcyclohexyl) propionic acid, obtained as described above in part (b), in 100 cc. of dry ether was added dropwise over a fifty minute period to a suspension of 20.2 g. of lithium aluminum hydride in 300 cc. of dry ether, while allowing the solution to reflux gently. The reaction mixture was cooled, 50 cc. of water was added followed by 500 cc. of concentrated hydrochloric acid. The aqueous layer was separated, and the ether layer was washed with 10% sodium carbonate solution and dried over anhydrous calcium sulfate. The ether solution was concentrated and distilled giving 51.4 g. of 3-(methylcyclohexyl)propanol (mixture of 2-, 3- and 4-methyl and cis and trans isomers), B. P. 75–76.5° C. (0.4 mm.), $n_D^{25}=1.4649$.

(d) 3-(methylcyclohexyl)propyl bromide

Hydrogen bromide gas was passed through a mixture of 51.3 g. of 3-(methylcyclohexyl)propanol, obtained as described above in part (c), over a period of about two hours at a temperature of about 85–110° C. The reaction mixture was cooled, 150 cc. of petroleum ether (Skellysolve B) was added, the water-layer which had formed was drawn off, and the petroleum ether solution was washed with three 25 cc. portions of concentrated sulfuric acid and then several times with sodium chloride solution, the last washing containing six drops of concentrated ammonium hydroxide. The petroleum ether solution was dried over anhydrous calcium sulfate, concentrated and distilled, collecting the material boiling at 62–66° C. (0.5 mm.). This material was redistilled, giving 58.5 g. of 3-(methylcyclohexyl)propyl bromide (mixture of 2-, 3- and 4-methyl and cis and trans isomers), B. P. 56.5–59.5° C. (0.21 mm.), $n_D^{25}=1.4832$.

*Analysis.*—Calcd. for $C_{10}H_{19}Br$: C, 54.80; H, 8.74; Br, 36.46. Found: C, 55.20; H, 8.66; Br, 36.23.

(e) 2-hydroxyethyl-bis[3-(methylcyclohexyl)propyl]-amine

A mixture of 43.8 g. of 3-(methylcyclohexyl)propyl bromide, obtained as described above in part (d), 6.1 g. of 2-aminoethanol, 12.7 g. of anhydrous sodium carbonate and 75 cc. of absolute ethanol was heated in an autoclave with shaking for eight hours at 142–146° C. The reaction mixture was cooled and concentrated by distillation. The residue was dissolved in benzene, and the benzene solution was washed with 10% sodium carbonate solution and with water and dried over anhydrous calcium sulfate. The benzene solution was concentrated in vacuo, and the residue was stirred several times with 100–200 cc. portions of petroleum ether (Skellysolve B), and the clear solution decanted from the insoluble oil. The petroleum ether soluble fraction was concentrated and distilled. The fraction boiling at 167–171° C. (0.14 mm.) (23.61 g.) was collected and redistilled, giving 2-hydroxyethyl-bis [3-(methylcyclohexyl)propyl]amine (mixture of 2-, 3- and 4-methyl and cis and trans isomers), B. P. 161–163.5° C. (0.11–0.12 mm.), $n_D^{25}=1.4848$.

*Analysis.*—Calcd. for $C_{22}H_{43}NO$: C, 78.27; H, 12.84; N, 4.15. Found: C, 78.50; H, 12.84; N, 4.22.

2-hydroxyethyl-bis[3-(methylcyclohexyl)propyl]amine has a coronary dilator activity forty times that of papaverine when measured on the isolated rabbit heart.

EXAMPLE 2

2-hydroxyethyl-bis[3-(3-methylcyclohexyl)propyl]amine

When the same series of reactions described above in Example 1 was carried out, using pure 3-methylcinnamic acid (free of the 2- and 4-methyl isomers), M. P. 118–119° C., the following compounds were successively obtained: β-(3-methylcyclohexyl)propionic acid, B. P. 129–130° C. (2 mm.), $n_D^{25}=1.4608$; 3-(3-methylcyclohexyl)propanol, B. P. 105° C. (4 mm.), $n_D^{25}=1.4619$; 3-(3-methylcyclohexyl)propyl bromide, B. P. 95° C. (4 mm.), $n_D^{25}=1.4820$; and 2-hydroxyethyl-bis[3-(3-methylcyclohexyl)propyl]amine (mixture of cis and trans isomers), B. P. 157° C. (0.04 mm.), $n_D^{25}=1.4830$.

If in the above examples 3-methylcinnamic acid is replaced by 2-ethylcinnamic acid, 3-propylcinnamic acid or 4-butylcinnamic acid (prepared, respectively, by condensing 2-ethylbenzaldehyde, 3-propylbenzaldehyde or 4-butylbenzaldehyde with malonic acid according to the Knoevenagel reaction) and carried through the same series of reactions, there can be obtained, respectively, 2-hydroxyethyl-bis[3-(2-ethylcyclohexyl)propyl]amine, 2-hydroxyethyl - bis[3 - (3 - propylcyclohexyl)propyl]-amine, or 2-hydroxyethyl-bis[3-(4-butylcyclohexyl)-propyl]amine.

EXAMPLE 3

(a) cis-β-(3-methylcyclohexyl)propionamide

A mixture of 102.1 g. of β-(3-methylcyclohexyl)-propionic acid (see Example 2) and 107.1 g. of thionyl chloride was kept at room temperature for twenty-four hours. The excess thionyl chloride was removed by distillation in vacuo, last traces of which were removed by addition of two 75 cc. portions of dry benzene and concentration of the reaction mixture in vacuo. The residue was added to 800 cc. of concentrated ammonium hydroxide and rapidly stirred at a temperature of −10–0° C. The mixture was stirred for one hour, and the solid material was collected by filtration, washed with water and dried, giving 98.5 g. of β-(3-methylcyclohexyl)propionamide, M. P. 78–82° C. The latter material was repeatedly recrystallized from 50% methanol until the melting point had been raised to 90–91° C., which material comprised the pure cis-isomer.

(b) *cis-β-(3-methylcyclohexyl)propionic acid* cis-β-(3-methylcyclohexyl)propionamide (33.9 g.), prepared as described above in part (a) was dissolved in concentrated sulfuric acid. The sulfuric acid solution was cooled to −5° C., and a solution of 35 g. of sodium nitrite in 140 cc. of water was dropped under the surface of the sulfuric acid solution with stirring over a period of one and one-half hours. The mixture was stirred for an additional one-half hour, then carefully diluted with 350 cc. of water until the temperature reached 50° C., and kept at 50–60° C. for one-half hour. One kilogram of ice was added to the mixture which was then extracted with petroleum ether (Skellysolve B), washed with water and extracted with 10% sodium carbonate solution. The sodium carbonate solution was acidified with hydrochloric acid, and the acid which separated was extracted with petroleum ether. Concentration of the extracts gave 31.7 g. of residue which was distilled at 131° C. (2 mm.), giving 28 g. of cis-β-(3-methylcyclohexyl)propionic acid, $n_D^{25}=1.4600$.

(c) *cis-2-hydroxyethyl-bis[3-(3-methylcyclohexyl)-propyl]amine*

When the cis-β-(3-methylcyclohexyl)propionic acid, obtained above in part (b), was carried through the same series of reactions described in Example 1, parts (c), (d) and (e), the following compounds were obtained: cis-3-(3-methylcyclohexyl)propanol, B. P. 101–102° C. (4 mm.), $n_D^{25}=1.4612$; cis-3-(3-methylcyclohexyl)propyl bromide, B. P. 91° C. (4 mm.), $n_D^{25}=1.4811$; and cis-2-hydroxyethyl-bis[3-(3-methylcyclohexyl)propyl]amine, B. P. 151–152° C.(0.035 mm.), $n_D^{25}=1.4822$.

*Analysis.*—Calcd. for $C_{22}H_{43}NO$: C, 78.27; H, 12.84; N, 4.15. Found: C, 77.89; H, 12.58; N, 4.14.

EXAMPLE 4

(a) β-(4-methycyclohexyl)propionic acid was prepared from 121.5 g. of 4-methylcinnamic acid and 4.0 g. of platinum oxide catalyst according to the method described above in Example1, part (b). There was thus obtained 121.2 g. of β-(4-methylcyclohexyl)propionic acid (mixture of cis and trans isomers), B. P. 106–107° C. (0.65 mm.), $n_D^{25}=1.4620$.

(b) 3-(4-methylcyclohexyl)propanol was prepared from 120.5 g. of β-(4-methylcyclohexyl)propionic acid and 40.5 g. of lithium aluminum hydride according to the manipulative procedure described above in Example 1, part (c). There was thus obtained 96.4 g. of 3-(4-methylcyclohexyl)propanol (mixture of cis and trans isomers), B. P. 75–76° C. (0.72–0.82 mm.), $n_D^{25}=1.4632$.

(c) 3-(4-methylcyclohexyl)propyl bromide was prepared from 98 g. of 3-(4-methylcyclohexyl)propanol and hydrogen bromide according to the manipulative procedure described above in Example 1, part (d). There was thus obtained 128 g. of 3-(4-methylcyclohexyl)propyl bromide (mixture of cis and trans isomers), B. P. 80–81.5° C. (1.5 mm.), $n_D^{25}=1.4832$.

*Analysis.*—Calcd. for $C_{10}H_{19}Br$: C, 54.80; H, 8.74; Br, 36.46. Found: C, 54.74; H, 8.68; Br, 36.1.

(d) *2-hydroxyethyl-bis[3-(4-methylcyclohexyl)propyl]amine*

A mixture of 65.7 g. of 3-(4-methylcyclohexyl)propyl bromide, 9.15 g. of 2-aminoethanol, 19.1 g. of anhydrous sodium carbonate and 70 cc. of absolute ethanol was heated in an autoclave for eight hours at 142–147° C. The reaction mixture was worked up according to the manipulative procedure described above in Example 1, part (e), and the product was distilled. The fraction boiling at 165.5° C. (0.06 mm.) was collected, giving 33.6 g. of 2-hydroxyethyl-bis[3-(4-methylcyclohexyl)-propyl]amine (mixture of cis and trans isomers), $n_D^{25}=1.4835$.

*Analysis.*—Calcd. for $C_{22}H_{43}NO$: C, 78.27; H, 12.84; N, 4.15. Found: C, 78.56; H, 12.93; N, 4.22.

2-hydroxyethyl-bis[3-(4-methylcyclohexyl)propyl]amine has a coronary dilator activity fifteen to twenty times that of papaverine when measured on the isolated rabbit heart.

EXAMPLE 5

(a) *Benzyl-bis[3-(4-methylcyclohexyl)propyl]amine*

A solution of 16.05 g. of benzylamine in 50 cc. of absolute ethanol was added over a one hour period to a mixture of 65.7 g. of 3-(4-methylcyclohexyl)propyl bromide, 21.2 g. of anhydrous sodium carbonate and 150 cc. of absolute ethanol. The mixture was refluxed for seven and one-half hours after the addition of amine was completed, and was allowed to stand overnight. The mixture was extracted with benzene and the benzene extracts were washed with 10% sodium carbonate solution and 10% sodium hydroxide solution and with water. The benzene solution was dried and concentrated, and the residue was stirred with petroleum ether (Skellysolve A) and the clear solution decanted and concentrated. The residue was distilled and the fraction boiling at 177–180° C. (0.05 mm.) (34.46 g.) was collected and redistilled, giving benzyl-bis[3-(4-methylcyclohexyl)-propyl]amine (mixture of cis and trans isomers), B. P. 180–181° C. (0.09 mm.), $n_D^{25}=1.5059$.

*Analysis.*—Calcd. for $C_{27}H_{45}N$: C, 84.52; H, 11.82; N, 3.65. Found: C, 84.53; H, 11.77; N, 3.64.

(b) *Bis[3-(4-methylcyclohexyl)propyl]amine*

A mixture of 15.6 g. of benzyl-bis[3-(4-methylcyclohexyl)propyl]amine, 275 cc. of 95% ethanol and one teaspoonful of buffered palladium-on-charcoal catalyst was shaken in an atmosphere of hydrogen at a temperature of 42–51° C. until absorption of hydrogen had ceased. The catalyst was removed by filtration and the filtrate was concentrated and distilled, giving about 9 g. of bis[3-(4-methylcyclohexyl)propyl]amine (mixture of cis and trans isomers), B. P. 138–140° C. (0.09 mm.), $n_D^{25}=1.4786$.

*Analysis.*—Calcd. for $C_{20}H_{39}N$: C, 81.83; H, 13.39; N, 4.77. Found: C, 82.23; H, 13.08; N, 4.76.

A sample of bis[3-(4-methylcyclohexyl)propyl]amine when treated with dilute hydrochloric acid and the resulting solid collected, dried and recrystallized from acetone gave the hydrochloride salt, M. P. 186.5–188° C.

(c) Hydroxymethyl-bis[3-(4-methylcyclohexyl)-propyl]amine can be prepared by treating bis[3-(4-methylcyclohexyl)propyl]amine with formaldehyde under alkaline conditions, for example in the presence of sodium carbonate.

EXAMPLE 6

*2-hydroxyethyl-bis(3-cyclohexylpropyl)amine*

A mixture of 82.06 g. of 3-cyclohexylpropyl bromide, 12.2 g. of 2-aminoethanol, 23.3 g. of anhydrous sodium carbonate and 250 cc. of absolute ethanol was refluxed for twelve hours. The reaction mixture was worked up according to the manipulative procedure given above in Example 1, part (e). The product was distilled giving 44.4 g. of 2-hydroxyethyl-bis(3-cyclohexylpropyl)amine, B. P. 145–147° C. (0.05–0.07 mm.), $n_D^{25}=1.4872$.

*Analysis.*—Calcd. for $C_{20}H_{39}NO$: C, 77.60; H, 12.70; N, 4.53. Found: C, 78.06; H, 12.55; N, 4.48.

EXAMPLE 7

*3-cyclohexylpropyl-[1,1-bis(hydroxymethyl)propyl] amine*

A mixture of 61.54 g. of 3-cyclohexylpropyl bromide, 17.87 g. of 1,1-bis(hydroxymethyl)propylamine, 17.5 g. of anhydrous sodium carbonate and 200 cc. of absolute ethanol was refluxed for 23 hours. The reaction mixture was worked up according to the manipulative procedure given above in Example 1, part (e), and the product distilled. The fraction boiling at 150–152° C. (0.06–0.07 mm.) (33.36 g.) was collected and redistilled, giving crude 3 - cyclohexylpropyl - [1,1 - bis(hydroxymethyl)propyl]amine, B. P. 136.5–137° C. (0.03 mm.), $n_D^{25}$=1.4882–912. The latter material was dissolved in chloroform and extracted with dilute hydrochloric acid. The hydrochloric acid extracts were made basic with potassium carbonate and extracted with chloroform. The chloroform extracts were concentrated and the residue crystallized from ethyl acetate, giving pure 3-cyclohexylpropyl - [1,1 - bis(hydroxymethyl)propyl]amine, M. P. 49.5–52° C.

*Analysis.*—Calcd. for $C_{14}H_{29}NO_2$: C, 69.09; H, 12.01; N, 5.76. Found: C, 69.33; H, 11.73; N, 5.75.

The crude product obtained above contained some of the tertiary amine, bis(3-cyclohexylpropyl)-[1,1-bis-(hydroxymethyl)propyl]amine. Larger quantities of the latter can be obtained by longer heating (several days) of the reaction mixture.

EXAMPLE 8

*Bis(3-cyclohexylpropyl)-2,3-dihydroxypropylamine*

A mixture of 30.53 g. of bis(3-cyclohexylpropyl)amine (prepared by hydrogenolysis of benzyl-bis(3-cyclohexylpropyl)amine, B. P. 154–156° C. (0.03 mm.) according to the manipulative procedure described above in Example 5, part (b), 7.3 g. of anhydrous sodium carbonate, 13.98 g. of 2,3-dihydroxypropyl chloride and 200 cc. of absolute ethanol was refluxed for 65.5 hours. The reaction mixture was worked up according to the manipulative procedure described above in Example 1, part (e), and the product distilled. The fraction boiling at 175–176° C. (0.03 mm.) was collected and redistilled, giving 21.71 g. of bis(3-cyclohexylpropyl)-2,3-dihydroxypropylamine, B. P. 173–175° C. (0.03 mm.), $n_D^{25}$=1.4928.

*Analysis.*—Calcd. for $C_{21}H_{41}NO_2$: C, 74.28; H, 12.17; N, 4.13. Found: C, 73.81; H, 11.72; N, 4.12.

EXAMPLE 9

*3 - cyclohexylpropyl - [tris(hydroxymethyl)methyl]amine and bis(3 - cyclohexylpropyl) - [tris(hydroxymethyl)methyl]amine*

A mixture of 61.54 g. of 3-cyclohexylpropyl bromide, 18.17 g. of tris[hydroxymethyl]methylamine, 17.5 g. of anhydrous sodium carbonate and 200 cc. of absolute ethanol was refluxed for 112 hours. The reaction mixture was concentrated in vacuo and the residue was extracted with chloroform. The chloroform extracts were washed with water and then with several portions of dilute hydrochloric acid. The chloroform solution (solution A) was separated from the aqueous acid layer, and the combined acid extracts were made basic with sodium carbonate and extracted with chloroform (solution B).

Chloroform solution A was concentrated in vacuo and the residue stirred with petroleum ether (Skellysolve A) and the solid material was collected by filtration and amounted to 22.15 g. of the hydrochloride salt of bis(3-cyclohexylpropyl) - [tris(hydroxymethyl)methyl]amine. The latter was dissolved in chloroform and the solution was washed with sodium carbonate solution, the chloroform layer separated and concentrated. The residue was recrystallized from acetone, giving 16.8 g. of bis(3-cyclohexylpropyl)-[tris(hydroxymethyl)methyl]amine, M. P. 110.5–111.5° C.

*Analysis.*—Calcd. for $C_{22}H_{43}NO_3$: C, 71.49; H, 11.73; N, 3.79. Found: C, 71.69; H, 11.45; N, 3.78.

Bis(3-cyclohexylpropyl)-[tris(hydroxymethyl)methyl]amine (200 mg.) was dissolved in 4 cc. of an aqueous solution containing 59.6 mg. of ethanesulfonic acid, thus obtaining a solution of the ethanesulfonate salt with pH 4.5.

A mixture of 11.07 g. of bis(3-cyclohexylpropyl)-[tris(hydroxymethyl)methyl]amine and 5.76 g. of quinic acid in 65 cc. of absolute ethanol was heated until solution was complete. The solution was diluted with about 250 cc. of ether, cooled, and the product which had separated was collected by filtration, giving 16.2 g. of the quinate salt of bis(3 - cyclohexylpropyl) - [tris(hydroxymethyl)methyl]amine, M. P. 119–120° C.

Chloroform solution B was concentrated and the residue was recrystallized from acetone, giving 12.45 g. of 3-cyclohexylpropyl - [tris(hydroxymethyl)methyl]amine, M. P. 86–88° C. Further purification gave a product with the M. P. 91–93° C.

*Analysis.*—Calcd. for $C_{13}H_{27}NO_3$: C, 63.63; H, 11.09; N, 5.71. Found: C, 64.00; H, 10.96; N, 5.67.

EXAMPLE 10

*3 - (3 - methylcyclohexyl)propyl - [tris(hydroxymethyl)methyl]amine and bis[3-(3-methylcyclohexyl)propyl]-[tris(hydroxymethyl)methyl]amine*

A mixture of 19.7 g. of 3-(3-methylcyclohexyl)propyl bromide (see Example 2), 5.4 g. of tris(hydroxymethyl)-methylamine, 5.7 g. of anhydrous sodium carbonate and 100 cc. of absolute ethanol was refluxed for 53 hours. The crude solid product, 11.5 g., M. P. 59–61° C., was isolated, essentially as described above in Example 1, part (e), and dissolved in a solution of 10 cc. of concentrated sulfuric acid in 50 cc. of water. The solution was diluted with 300 cc. of water and cooled in an ice-bath. The gum which separated was collected by filtration and stirred with 14% ammonium hydroxide solution. The resulting free base was collected by filtration and recrystallized from acetone, giving 1.9 g. of bis[3-(3-methylcyclohexyl)-propyl]-[tris(hydroxymethyl)methyl]amine, M. P. 97–99° C. A further recrystallization from acetone gave a sample with the M. P. 99.5–100.5° C.

*Analysis.*—Calcd. for $C_{24}H_{47}NO_3$: C, 72.49; H, 11.91; N, 3.52. Found: C, 72.68; H, 12.19; N, 3.51.

The filtrate from the crude tertiary amine sulfate contained the soluble secondary amine sulfate. This filtrate was saturated with potassium carbonate, and the gummy material which separated was collected by filtration, dissolved in chloroform, concentrated in vacuo, and the residue (9.0 g.) was recrystallized from acetone, giving 3 - (3 - methylcyclohexyl)propyl - [tris(hydroxymethyl)-methyl]amine, M. P. 68–69° C.

*Analysis.*—Calcd. for $C_{14}H_{29}NO_3$: C, 64.82; H, 11.27; N, 5.40. Found: C, 65.19; H, 11.08; N, 5.40.

We claim:

1. A compound selected from the class consisting of amines having the formula

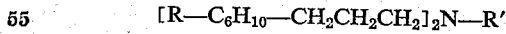

wherein $C_6H_{10}$ is a cyclohexane ring, R is selected from the group consisting of hydrogen and lower-alkyl groups, and R' is a lower-alkyl group bearing from one to three hydroxy groups which, if plural, are attached to different carbon atoms; and acid-addition salts thereof the anions of which do not increase the toxicity of the compound toward animal organisms.

2. Hydroxy-lower-alkyl-bis(3-cyclohexylpropyl)amines having from one to three hydroxy groups which, if plural, are attached to different carbon atoms of the lower-alkyl group.

3. Hydroxy-lower-alkyl-bis[3-(lower-alkylcyclohexyl)-propyl]amines in which the hydroxy-lower-alkyl group contains from one to three hydroxy groups which, if plural, are attached to different carbon atoms.

4. Mono-hydroxy-lower-alkyl-bis(3-cyclohexylpropyl)-amines.

5. Di-hydroxy-lower-alkyl - bis(3 - cyclohexylpropyl)-amines in which the hydroxy groups are attached to different carbon atoms of the lower-alkyl group.

6. Tri-hydroxy-lower-alkyl - bis(3 - cyclohexylpropyl)-amines in which the hydroxy groups are attached to different carbon atoms of the lower-alkyl group.

7. 2 - hydroxyethyl-bis[3-(3-methylcyclohexyl)propyl]-amine.

8. 2 - hydroxyethyl-bis[3-(4-methylcyclohexyl)propyl]-amine.

9. Bis(3 - cyclohexylpropyl) - 2,3 - dihydroxypropyl-amine.

10. Bis(3 - cyclohexylpropyl) - [tris(hydroxymethyl)methyl]amine.

11. The process for preparing a hydroxy-lower-alkyl-bis(3-cyclohexylpropyl)amine having from one to three hydroxy groups which, if plural, are attached to different carbon atoms of the lower-alkyl group, which comprises heating a 3-cyclohexylpropyl halide with a hydroxy-lower-alkylamine in the presence of an acid acceptor.

12. The process for preparing bis(3-cyclohexylpropyl)-[tris(hydroxymethyl)methyl]amine which comprises heating a 3-cyclohexylpropyl halide with tris(hydroxymethyl)methylamine in the presence of an acid acceptor.

13. 2-hydroxyethyl-bis(3-cyclohexylpropyl)amine.

14. Bis[3-(3-methylcyclohexyl)propyl] - [tris(hydroxymethyl)methyl]amine.

References Cited in the file of this patent

UNITED STATES PATENTS

| | | |
|---|---|---|
| 2,180,344 | Blicke | Nov. 21, 1939 |
| 2,226,160 | Dietrich | Dec. 24, 1940 |
| 2,278,123 | Heyn | Mar. 31, 1942 |

FOREIGN PATENTS

| | | |
|---|---|---|
| 404,674 | Great Britain | Jan. 19, 1934 |

U. S. DEPARTMENT OF COMMERCE
PATENT OFFICE

CERTIFICATE OF CORRECTION

Patent No. 2,828,340                                   March 25, 1958

William B. Dickinson et al.

It is hereby certified that error appears in the printed specification of the above numbered patent requiring correction and that the said Letters Patent should read as corrected below.

Column 3, line 45, for "(0.08-9.11 mm.) read -- (0.08-0.11 mm.) --.

Signed and sealed this 6th day of May 1958.

(SEAL)

Attest:
KARL H. AXLINE
Attesting Officer

ROBERT C. WATSON
Commissioner of Patents